United States Patent [19]

Afzali-Ardakani et al.

[11] 4,446,193

[45] May 1, 1984

[54] PROCESS FOR CHEMICALLY BONDING LUBRICANT TO AN INFORMATION CARRIER AND PRODUCTS THEREOF

[75] Inventors: Ali Afzali-Ardakani, Ossining, N.Y.; John I. Crowley, Palo Alto; Anthony W. Wu, San Jose, both of Calif.

[73] Assignee: International Business Machines Corporation, Armonk, N.Y.

[21] Appl. No.: 489,918

[22] Filed: Apr. 29, 1983

[51] Int. Cl.³ .............................................. B32B 27/00
[52] U.S. Cl. .................................. 428/422; 427/130; 427/131; 427/333; 428/695; 428/900
[58] Field of Search .............................. 427/127–132, 427/48, 333; 428/900, 694, 695, 422

[56] References Cited

U.S. PATENT DOCUMENTS

| | | | |
|---|---|---|---|
| 4,120,995 | 10/1978 | Phipps et al. | 427/248 A |
| 4,188,434 | 2/1980 | Loran | 428/65 |
| 4,232,072 | 11/1980 | Pardee | 428/65 |
| 4,268,556 | 5/1981 | Pedrotty | 428/65 |

*Primary Examiner*—Bernard D. Pianalto
*Attorney, Agent, or Firm*—Joseph G. Walsh

[57] ABSTRACT

A lubricant is chemically bonded to an information carrying solid surface by contacting the surface with a diazoketone-terminated polymeric lubricant and decomposing said diazoketone-terminated polymeric lubricant to form a carbene which reacts with the solid surface.

6 Claims, No Drawings

PROCESS FOR CHEMICALLY BONDING LUBRICANT TO AN INFORMATION CARRIER AND PRODUCTS THEREOF

DESCRIPTION

1. Technical Field

The present application is concerned with a process for chemically bonding a lubricant to an information carrier surface and with products formed by that process.

2. Background Art

At present it is conventional to use a lubricant on the surface of information carrying media such as magnetic recording disks and tapes. The lubricants are merely physically applied to the surface by purely mechanical means, and are retained on the surface by purely mechanical action, for example, capillary force. Publications which illustrate the mere physically placing of a lubricant on a solid surface include for example, U.S. Pat. Nos. 4,188,434; 4,232,072 and 4,268,556. In these patents there is no chemical bonding between the lubricant and the surface being lubricated.

U.S. Pat. No. 4,120,995 does show chemical bonding between a lubricant and a solid surface. The process of that patent, however, involves chemical reactions which are obviously entirely different and distinct from those of the process of the present invention.

DISCLOSURE OF THE INVENTION

According to the present invention, a lubricant is chemically bonded to an information carrying solid surface by contacting that surface with a diazoketone-terminated polymeric lubricant and decomposing said diazoketone-terminated polymeric lubricant to form a carbene which reacts with the solid surface.

In the use of information carrying solid surfaces, for example, magnetic recording disks, a lubricant is required between the disk surface and the recording head to reduce friction and wear and to provide better start/-stop performance. Conventionally the lubricants are retained on the surface purely by mechanical action such as capillary force. Generally lubricants are chemically inert and because of this chemical inertness, show little interaction such as hydrogen bond or polar group interaction with most surfaces. Because of this, during operation when disks are constantly rotating at high speed, the lubricants are subjected to migration from the inner portions of the disk to the outer portions, where the capillary force is gradually overcome by the centrifugal force. The lubricants are thus subjected to spin-off.

According to the present invention, such problems are solved by chemically bonding the lubricant to the information carrying surface. When the lubricant is chemically bonded, it cannot be removed by traditional methods such as washing or rubbing with isopropanol or 1,1,2-trichlorotrifluoroethane. Information carrying solid surfaces include, for example, magnetic disks, magnetic tapes, sound recording media and the like. The surface may be a polymer, a metallic oxide or a composite.

The chemical bonding of the present invention takes place through what is known as a carbene intermediate. Carbene is a term well known in the literature as referring to intermediates having two free electrons, which may be either paired or unpaired. The carbene intermediates have an exceptionally high reactivity toward most organic polymers, and react with them to form carbon/carbon covalent bonds. The carbene intermediates also chemically bond with metal oxides.

In carrying out the process of the present invention, a diazoketone-terminated polymeric lubricant is contacted with the surface of the information carrying solid. The lubricant is applied by spin-on, wipe-on or spraying onto, for example, a disk surface, either directly as a pure liquid lubricant, or as a dilute solution in a solvent such as 1,1,2-trichlorotrifluoroethane. The diazoketone is subjected to decomposition either by photolysis, for example with an ultra violet lamp, or to heat treatment at a temperature of, for example, 180° or 220° C. The duration of the treatment is generally from about 15 to 30 minutes. After the treatment the diazoketone group has decomposed to lose two atoms of nitrogen per group and become a carbene intermediate. This carbene intermediate then chemically reacts with the surface. After reaction has been completed, any excess unbonded lubricant is washed off with a solvent such as 1,1,2-trichlorotrifluoroethane.

The presence of the bonded lubricant has been established by ESCA, FTIR and by n-decane contact angle measurements. A disk without the lubricant exhibits a contact angle of about 4° with n-decane, where the same disk surface treated with a chemically bonded lubricant of the present invention exhibits a contact angle of from 48° to 50° with n-decane. The contact angles do not increase even after repeated washings with 1,1,2-trichlorotrifluoroethane. The coefficient of friction of such bonding lubricant is about 0.12–0.2.

The diazoketone-terminated polymeric lubricants may be synthesized from the corresponding materials containing terminal carboxylic acid groups. The treatment of such group with $SOCl_2$ yields the corresponding acid chloride, which is then treated with $CH_2N_2$ (diazomethane) to yield the diazoketone compound. Preferred starting materials include perfluorinated lubricants such as poly(perfluoropropylene oxide) carboxylic acid, and poly(perfluoroethylene oxide) carboxylic acid.

In another useful variation of the present invention the starting material may be a dicarboxylic acid which is subjected to the process described above to yield a lubricant having diazoketone-terminated groups at both ends.

In still another variation of the present invention, an additional layer of lubricant may be added on top of the chemically bonded layer of lubricant. Due to the molecular attraction between the two layers of lubricant which have similar structures, the top layer tends to be held in place, and migration and spin-off are decreased.

The following example is given solely for the purpose of illustration of a preferred mode of carrying out the present invention. It should be understood that many variations of the invention are possible without departing from the spirit or scope thereof.

EXAMPLE

Preparation of a Diazoketone-terminated perfluoropolyether lubricants

A solution of acid chloride of a carboxylic acid terminated perfluoropolypropylene oxide (1) in 50 ml of dry

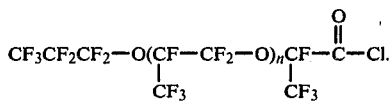
(1)

Perfluoro-2-butyltetrahydrofuran was added to an etheral solution of diazomethane, and the resulting mixture was stirred at room temperature for three hours. Excess diazomethane was destroyed by an addition of 1% acetic acid in ether. Evaporation of the solvent under reduced pressure gave the diazoketone-terminated perfluoropolyether lubricant (2)

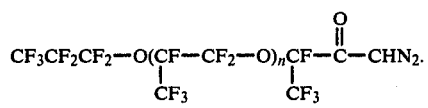
(2)

The structure of (2) was confirmed with IR absorptions at 2112 cm$^{-1}$ and 1675 cm$^{-1}$, and NMR absorption at $\delta = 3.83$. The diazoketone-terminated perfluoropolyether lubricant (2) was dissolved in trichlorotrifluoroethane to make up a 5% solution, and was applied to the surface of a magnetic disk by spraying. The treated disk surface was then subjected to either a heat treatment at 180°–220° C. for 30 minutes or an UV exposure to a 450 watt UV lamp for 30 minutes. The unreacted material was then washed off with trichlorotrifluoroethane and a lubricant layer was found to be chemically bonded to the surface.

We claim:

1. A process for chemically bonding a lubricant to an information carrying solid surface, said process characterized by contacting the surface with a diazoketone-terminated polymeric compound and decomposing said diazoketone-terminated polymeric compound to form a carbene which reacts with the solid surface.

2. A process as claimed in claim 1 wherein the polymeric compound is a diazoketone-terminated perfluoropolyether.

3. A process as claimed in claim 1 wherein an additional layer of lubricant is applied on top of the chemically bonded layer of lubricant.

4. An information recording medium lubricated according to the process of claim 1.

5. An information recording medium lubricated according to the process of claim 2.

6. An information recording medium lubricated according to the process of claim 3.

* * * * *